(12) United States Patent
Ohishi et al.

(10) Patent No.: US 10,835,982 B2
(45) Date of Patent: *Nov. 17, 2020

(54) MACHINE COMPONENT AND METHOD FOR PRODUCING THE SAME

(71) Applicant: KOMATSU LTD., Tokyo (JP)

(72) Inventors: Masayuki Ohishi, Neyagawa (JP); Masaharu Amano, Hirakata (JP)

(73) Assignee: KOMATSU LTD., Tokyo (JP)

( * ) Notice: Subject to any disclaimer, the term of this patent is extended or adjusted under 35 U.S.C. 154(b) by 542 days.

This patent is subject to a terminal disclaimer.

(21) Appl. No.: 15/500,651

(22) PCT Filed: Nov. 18, 2014

(86) PCT No.: PCT/JP2014/080539
§ 371 (c)(1),
(2) Date: Jan. 31, 2017

(87) PCT Pub. No.: WO2016/079812
PCT Pub. Date: May 26, 2016

(65) Prior Publication Data
US 2017/0216950 A1    Aug. 3, 2017

(51) Int. Cl.
*B32B 5/00* (2006.01)
*B23K 9/04* (2006.01)
(Continued)

(52) U.S. Cl.
CPC ............... *B23K 9/04* (2013.01); *B21J 1/003* (2013.01); *B21J 5/002* (2013.01); *B21K 1/06* (2013.01);
(Continued)

(58) Field of Classification Search
None
See application file for complete search history.

(56) References Cited

U.S. PATENT DOCUMENTS 2,003,019 A * 5/1935 Strobel ............... B23K 31/025
                                                    219/76.14
4,097,711 A   6/1978 Banerjee
(Continued)

FOREIGN PATENT DOCUMENTS

CN    102223982 A    10/2011
JP    H03-23025 A    1/1991
(Continued)

OTHER PUBLICATIONS

Murthy et al., Effect of grinding on the erosion behavior of a WC—Co—Cr coating deposited by HVOF ad detonation gun spray processes, Wear, 2001 (Year: 2001).*

(Continued)

Primary Examiner — Humera N. Sheikh
Assistant Examiner — Mary I Omori
(74) *Attorney, Agent, or Firm* — Oliff PLC

(57) ABSTRACT

A sprocket wheel, which is a machine component configured to slide relative to a bushing while being in contact with the bushing in an outer peripheral surface, includes a base made of a first metal, and an overlay that covers the base so as to constitute the outer peripheral surface. The surface of the overlay constituting the outer peripheral surface has been smoothed. Such a smoothed surface of the overlay makes the sprocket wheel less damaging to the bushing.

12 Claims, 10 Drawing Sheets

(51) Int. Cl.
*B23K 9/00* (2006.01)
*C21D 9/38* (2006.01)
*B21K 23/02* (2006.01)
*C21D 9/32* (2006.01)
*B21K 1/10* (2006.01)
*B21K 1/06* (2006.01)
*B21J 5/00* (2006.01)
*C21D 7/13* (2006.01)
*B21L 9/06* (2006.01)
*B21J 1/00* (2006.01)
*B21K 1/30* (2006.01)
*B23K 9/173* (2006.01)
*B23K 9/23* (2006.01)
*B32B 15/01* (2006.01)
*B23K 101/04* (2006.01)
*C21D 7/00* (2006.01)
*B62D 55/12* (2006.01)

(52) U.S. Cl.
CPC ............ *B21K 1/063* (2013.01); *B21K 1/10* (2013.01); *B21K 1/30* (2013.01); *B21K 23/02* (2013.01); *B21L 9/065* (2013.01); *B23K 9/0026* (2013.01); *B23K 9/044* (2013.01); *B23K 9/173* (2013.01); *B23K 9/23* (2013.01); *B32B 15/01* (2013.01); *C21D 7/13* (2013.01); *C21D 9/32* (2013.01); *C21D 9/38* (2013.01); *B23K 2101/04* (2018.08); *B62D 55/12* (2013.01); *C21D 7/00* (2013.01); *C21D 2251/04* (2013.01)

(56) References Cited

U.S. PATENT DOCUMENTS

| | | | | |
|---|---|---|---|---|
| 4,243,727 A | * | 1/1981 | Wisler | C23C 4/06 175/374 |
| 5,236,116 A | * | 8/1993 | Solanki | C23C 24/103 228/178 |
| 5,852,272 A | | 12/1998 | Amano | |
| 6,414,258 B1 | | 7/2002 | Amano | |
| 2009/0019783 A1 | * | 1/2009 | Amano | B23K 9/04 51/309 |
| 2010/0084379 A1 | * | 4/2010 | Wahlen | B23K 9/04 219/76.14 |
| 2010/0215849 A1 | | 8/2010 | Fischer et al. | |

FOREIGN PATENT DOCUMENTS

| | | |
|---|---|---|
| JP | H05-77042 A | 3/1993 |
| JP | H08-47774 A | 2/1996 |
| JP | 2007-268552 A | 10/2007 |
| JP | 2008-000763 A | 1/2008 |
| JP | 2013-046928 A | 3/2013 |
| JP | 2013046928 A * | 3/2013 |

OTHER PUBLICATIONS

Feb. 17, 2015 International Search Report issued in International Patent Application No. PCT/JP2014/080539.

* cited by examiner

MACHINE COMPONENT AND METHOD FOR PRODUCING THE SAME

TECHNICAL FIELD

The present invention relates to machine components and methods for producing the machine components, and more particularly, to a machine component that is to move relative to another component while being in contact with the other component, and a method for producing the machine component.

BACKGROUND ART

On a machine component, an overlay may be formed for improving wear resistance and other purposes. Overlays adoptable for improving the wear resistance include one having hard particles dispersed in a matrix made of steel, for example. Such an overlay can be formed, for example, by overlaying welding (see, for example, Japanese Patent Application Laid-Open No. 2008-763 (Patent Literature 1) and Japanese Patent Application Laid-Open No. H8-47774 (Patent Literature 2)).

CITATION LIST

Patent Literature

Patent Literature 1: Japanese Patent Application Laid-Open No. 2008-763
Patent Literature 2: Japanese Patent Application Laid-Open No. H8-47774

SUMMARY OF INVENTION

Technical Problem

When an overlay is formed, for improving wear resistance and other purposes, on a machine component that moves relative to another component while being in contact with the other component, the machine component may become more damaging to the other component. While the machine component with the overlay formed may be improved in durability, it may reduce the life of the other component.

An object of the present invention is to make a machine component, with an overlay formed, less damaging to another component.

Solution to Problem

A machine component according to the present invention is a machine component having a contact region and configured to move relative to another component while being in contact with the other component in the contact region. The machine component includes: a base made of a first metal; and an overlay covering the base so as to constitute at least a part of the contact region. A surface of the overlay constituting the contact region has been smoothed.

As described earlier, when an overlay is formed on a machine component, while the durability of the machine component with the overlay formed may be improved, the life of another component may be reduced. The present inventors have found that the machine component with the overlay formed can effectively be made less damaging to another component, by appropriately controlling the profile of the contact region of the machine component in the following manner. For forming an overlay, a material of the overlay in a liquid state is applied onto a machine component, which material then solidifies to form the overlay. The profile of the overlay is affected by surface tension in the liquid state and other factors, so it is difficult to control the profile with accuracy. When such an overlay is formed on a contact region of a component that is to be used in contact with another component, the low profile accuracy of the overlay may cause a local increase in contact pressure and other phenomena, making the component more damaging to the other component.

With the machine component of the present invention, the surface of the overlay constituting the contact region has been smoothed. This prevents a local increase in contact pressure and other phenomena, thereby making the machine component less damaging to another component. As used herein, the state in which the surface of the overlay has been smoothed refers to the state in which surface profile affected by surface tension in the liquid state and the like has been eliminated from the surface of the overlay.

In the machine component described above, the overlay may include a matrix made of a second metal, and hard particles dispersed in the matrix. This facilitates formation of an overlay excellent in wear resistance.

In the machine component described above, the hard particles located in an overlay surface region, which is a region within an average particle diameter of the hard particles from the surface of the overlay constituting the contact region, may be arranged side by side while being embedded in the overlay. This prevents the hard particles from being arranged protruding noticeably from the surface of the overlay. As a result, the hard particles are prevented from falling off during the use of the machine component. It should be noted that the average particle diameter of the hard particles can be obtained by observing a cross section perpendicular to the surface of the overlay with an optical microscope, and by calculating an average of the diameters of ten hard particles observed.

In the machine component described above, the hard particles located in the overlay surface region may be arranged in contact with the surface of the overlay. With this, the region of a hard particle exposed from the surface of the overlay becomes small, which prevents the hard particle from falling off.

In the machine component described above, among the hard particles located in the overlay surface region, any hard particle having a region exposed from the surface of the overlay may have an acute central angle (of less than 90°) corresponding to the region exposed from the surface of the overlay. With this, the region of a hard particle exposed from the surface of the overlay becomes small, which prevents the hard particle from falling off.

In the machine component described above, in a region including an interface between the overlay and the base, the overlay may include a protrusion that protrudes toward the base. This prevents the overlay from coming off the base.

In the machine component described above, the protrusion may have at least a part of the hard particle received therein. This more reliably prevents the overlay from coming off the base.

In the machine component described above, the surface of the overlay constituting the contact region may be smoothed by forging. By doing so, the surface of the overlay affected by surface tension in the liquid state and the like is smoothed by forging. This more reliably makes the component less damaging to another component.

A machine component producing method according to the present invention is a method for producing a machine component having a contact region and configured to move relative to another component while being in contact with the other component in the contact region. This machine component producing method includes the steps of: preparing a base member made of a first metal; forming an overlay in contact with a surface of the base member to cover the surface of the base member; and forging the base member having the overlay formed, such that the overlay constitutes at least a part of the contact region and such that the overlay is worked.

In the machine component producing method of the present invention, the base member having the overlay formed is forged such that the overlay constitutes at least a part of the contact region and such that the overlay is worked. Thus, the overlay having low profile accuracy, affected by surface tension in the liquid state and the like, is worked by forging, whereby the surface is smoothed. According to the machine component producing method of the present invention, the overlay is worked by forging, so the surface of the overlay is smoothed, and it is thus readily possible to produce a machine component less damaging to another component.

In the machine component producing method described above, the step of forging the base member having the overlay formed may include hot forging the base member having the overlay formed. Hot forging adopted can facilitate forging of the base member with the overlay formed.

In the machine component producing method described above, the step of forming the overlay may include forming the overlay including a matrix made of a second metal and hard particles dispersed in the matrix. This facilitates formation of an overlay excellent in wear resistance.

Effects of Invention

As is clear from the above description, according to the machine component and its producing method of the present invention, it is possible to make a machine component with an overlay formed, less damaging to another component.

DESCRIPTION OF EMBODIMENTS

Figure 1:
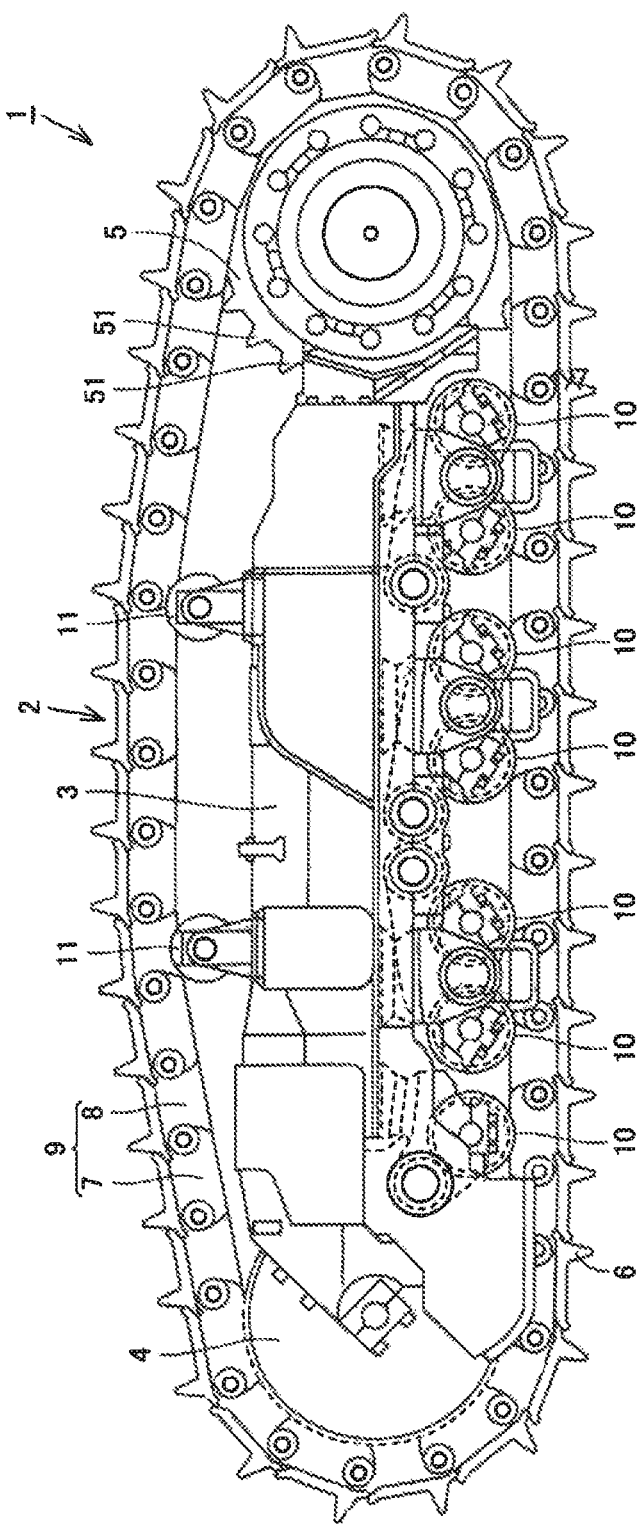
FIG. 1 is a schematic diagram showing the structure of a track travel device.

An embodiment of the present invention will be described below. In the following drawings, the same or corresponding parts are denoted by the same reference numerals, and the description thereof will not be repeated.

Figure 2:
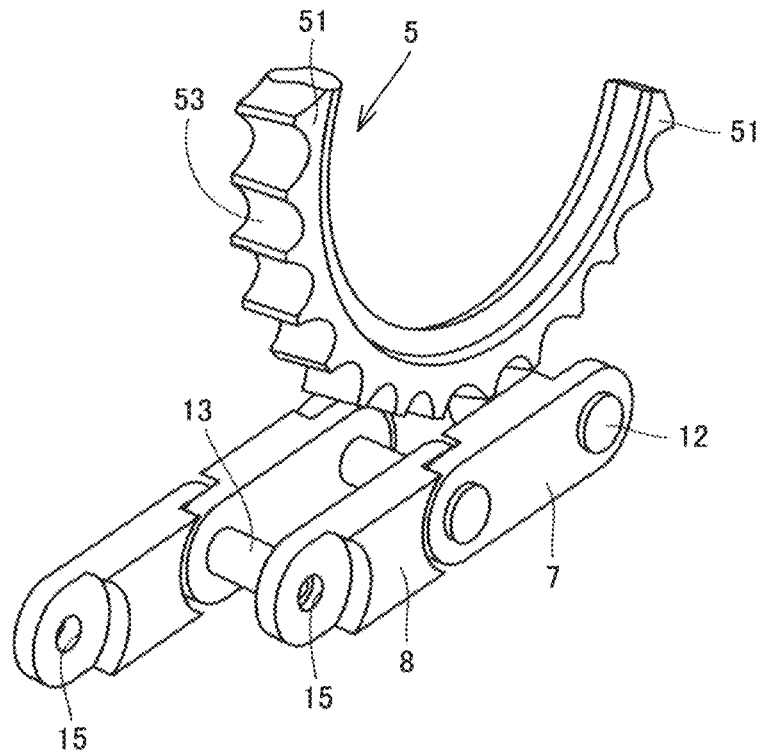
FIG. 2 is a schematic diagram illustrating operations of a sprocket wheel and bushings.
Figure 3:
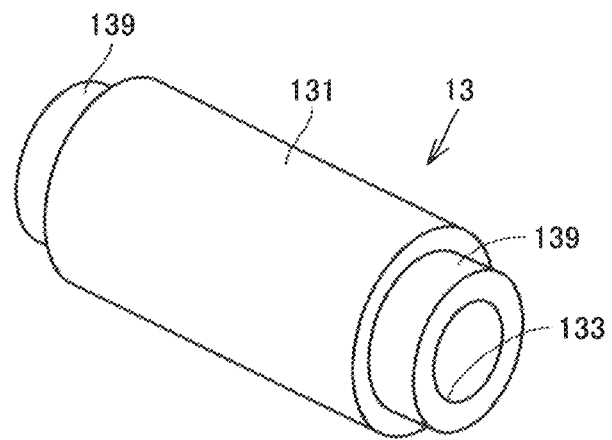
FIG. 3 is a schematic perspective view showing the structure of a bushing.
Figure 4:
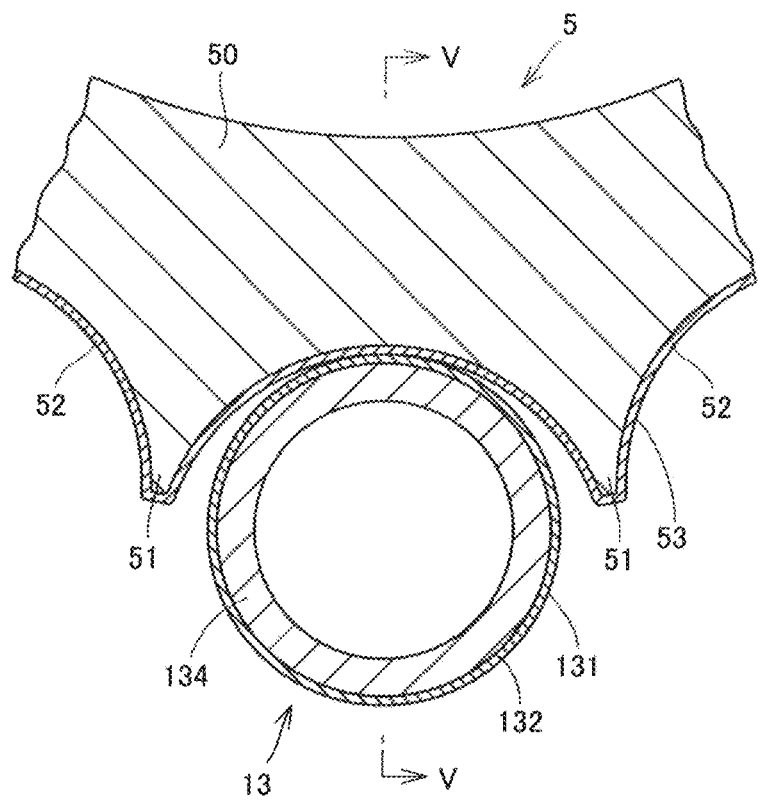
FIG. 4 is a schematic cross-sectional view showing the contact state of the sprocket wheel and a bushing.
Figure 5:
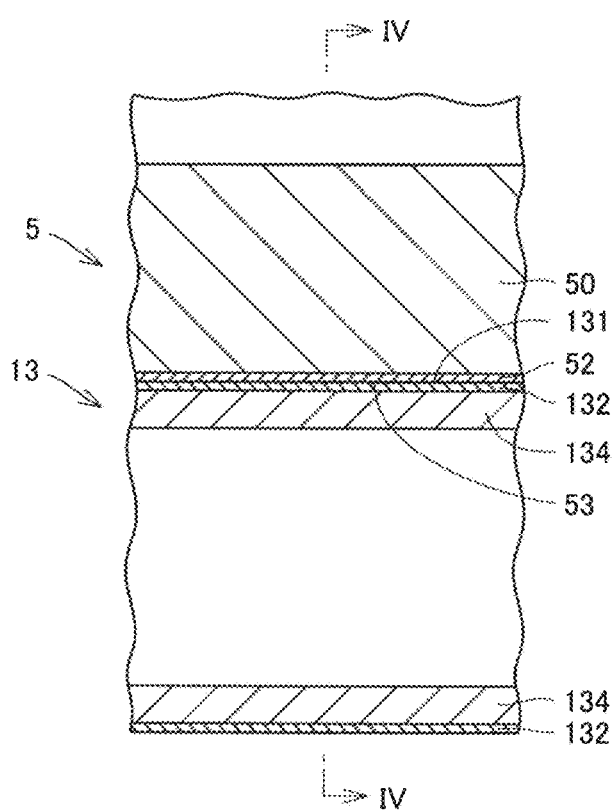
FIG. 5 is a schematic cross-sectional view taken along the line V-V in FIG. 4.

A machine component according to the present embodiment will be described taking a sprocket wheel and bushings of a track travel device as examples. FIG. 1 is a schematic diagram showing the structure of a track travel device. FIG. 2 is a schematic diagram illustrating operations of a sprocket wheel and bushings. FIG. 3 is a schematic perspective view showing the structure of a bushing. FIGS. 4 and 5 are schematic cross-sectional views showing the contact state of the sprocket wheel and a bushing.

Referring to FIG. 1, a track travel device 1 in the present embodiment is a travel device for a work machine such as a bulldozer, and includes: a track 2; a track frame 3; an idler tumbler 4; a sprocket wheel 5; a plurality of (here, seven) track rollers 10; and a plurality of (here, two) carrier rollers 11.

The track 2 includes a plurality of track links 9, which are connected endlessly, and track shoes 6, which are fixed to the corresponding track links 9. The track links 9 include outer links 7 and inner links 8. The outer links 7 and the inner links 8 are connected alternately.

The idler tumbler 4, the plurality of track rollers 10, and the plurality of carrier rollers 11 are attached to the track frame 3 in such a manner that they are rotatable about their respective axes. The sprocket wheel 5 is arranged on one end of the track frame 3. A power source such as an engine is connected to the sprocket wheel 5, and the sprocket wheel 5, driven by the power source, rotates about its axis. On an outer peripheral surface of the sprocket wheel 5, a plurality of projections 51 are arranged which project radially outward. The projections 51 mesh with the track 2. The rotation of the sprocket wheel 5 is thus transmitted to the track 2. The track 2, driven by the rotation of the sprocket wheel 5, rotates in a circumferential direction.

The idler tumbler 4 is attached to the other end (opposite to the end where the sprocket wheel 5 is arranged) of the track frame 3. Further, on the track frame 3, in the region sandwiched between the sprocket wheel 5 and the idler tumbler 4, the track rollers 10 and the carrier rollers 11 are attached respectively on the ground contact side and on the side opposite to the ground contact side. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in the circumferential direction while being guided by the idler tumbler 4, the sprocket wheel 5, the track rollers 10, and the carrier rollers 11.

Referring to FIG. 2, an outer link 7 and an inner link 8 adjacent to each other are connected by means of a connecting pin 12 and a bushing 13. Each inner link 8 has two through holes 15 formed to penetrate in a direction perpendicular to the plane of rotation of the track 2. One and the other of these two through holes 15 are formed on one end and the other end, respectively, in the longitudinal direction of the link. Each outer link 7 has two through holes 15 formed to penetrate in a direction perpendicular to the plane of rotation of the track 2. One and the other of these two through holes 15 are formed on one end and the other end, respectively, in the longitudinal direction of the link.

Referring to FIG. 3, the bushing 13 has a hollow cylindrical shape. The bushing 13 has a smaller-diameter portion 139, having a smaller outer diameter, formed on each end. The bushing 13 has an inner peripheral surface 133 having a constant diameter over the length. The bushing 13 is reduced in thickness in the smaller-diameter portions 139.

Referring to FIGS. 2 and 3, a pair of outer links 7 are arranged such that their two through holes 15 are aligned respectively as seen from the direction perpendicular to the plane of rotation of the track 2. A pair of inner links 8 are arranged such that their two through holes 15 are aligned respectively as seen from the direction perpendicular to the plane of rotation of the track 2. An outer link 7 and an inner link 8 adjacent to each other are arranged such that one through hole 15 of the outer link 7 and one through hole 15 of the inner link 8 are aligned as seen from the direction perpendicular to the plane of rotation of the track 2. A bushing 13 is arranged such that it is sandwiched between a pair of inner links 8 and such that the smaller-diameter portion 139 on each end is inserted into a through hole 15 of the corresponding inner link 8. A connecting pin 12 is arranged to penetrate through the through holes 15 of the neighboring outer and inner links 7 and 8, the holes being aligned as seen from the direction perpendicular to the plane of rotation of the track 2, and through the space surrounded by the inner peripheral surface 133 of the corresponding bushing 13. The connecting pin 12 is arranged to penetrate through the bushing 13 in the longitudinal direction.

The sprocket wheel 5 rotates in a circumferential direction, with its outer peripheral surface 53 meshing with outer peripheral surfaces 131 of the bushings 13 constituting the track 2. The outer peripheral surface 53 of the sprocket wheel 5 and the outer peripheral surface 131 of each bushing 13 are thus required to have high wear resistance. The sprocket wheel 5 is a machine component that slides relative to another component, or, the bushing 13, while being in contact with the bushing 13 in the contact region, or, the outer peripheral surface 53. The bushing 13 is a machine component that slides relative to another component, or, the sprocket wheel 5, while being in contact with the sprocket wheel 5 in the contact region, or, the outer peripheral surface 131.

Referring to FIGS. 4 and 5, the sprocket wheel 5 includes a base 50, made of a metal (steel), and an overlay 52 which covers the base 50 so as to form the outer peripheral surface 53, which is the contact region. The outer peripheral surface 53 which is the surface of the overlay 52 has been smoothed. Here, the state in which the outer peripheral surface 53, i.e. the surface of the overlay 52, is smoothed refers to the state in which surface profile affected by surface tension and the like at the time of formation of the overlay 52 in the liquid state has been eliminated from the surface of the overlay 52. In the present embodiment, the outer peripheral surface 53, which is the surface of the overlay 52, is a forged surface. The outer peripheral surface 53, or, the surface of the overlay 52 affected by surface tension and the like during formation of the overlay 52 in the liquid state, has been smoothed by forging. For the metal forming the base 50, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted.

A bushing 13 includes a base 134, and an overlay 132 which covers the base 134 so as to form the outer peripheral surface 131, which is the contact region. The outer peripheral surface 131 which is the surface of the overlay 132 has been smoothed. In the present embodiment, the outer peripheral surface 131, which is the surface of the overlay 132, is a forged surface. The outer peripheral surface 131, or, the surface of the overlay 132 affected by surface tension and the like during formation of the overlay 52 in the liquid state, has been smoothed by forging. For the metal forming the base 134, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted.

In the sprocket wheel 5 and the bushings 13 which are the machine components in the present embodiment, the surfaces of the overlays 52 and 132, which become the contact regions, have been smoothed. This prevents a local increase in contact pressure and other phenomena, making the components less damaging to the other components (bushings 13 and sprocket wheel 5).

Figure 6:
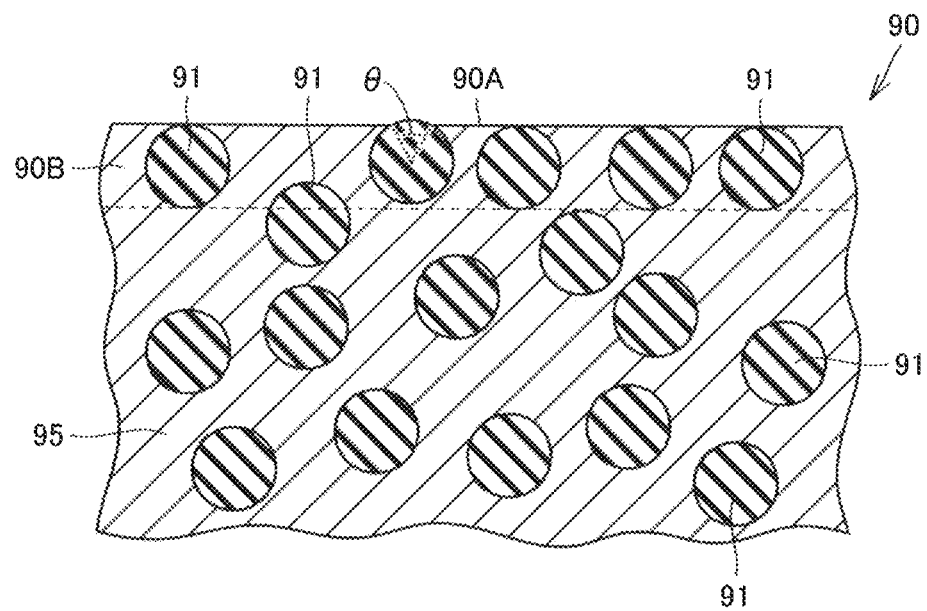
FIG. 6 is a schematic cross-sectional view showing the structure of an overlay at and near its surface.
Figure 7:
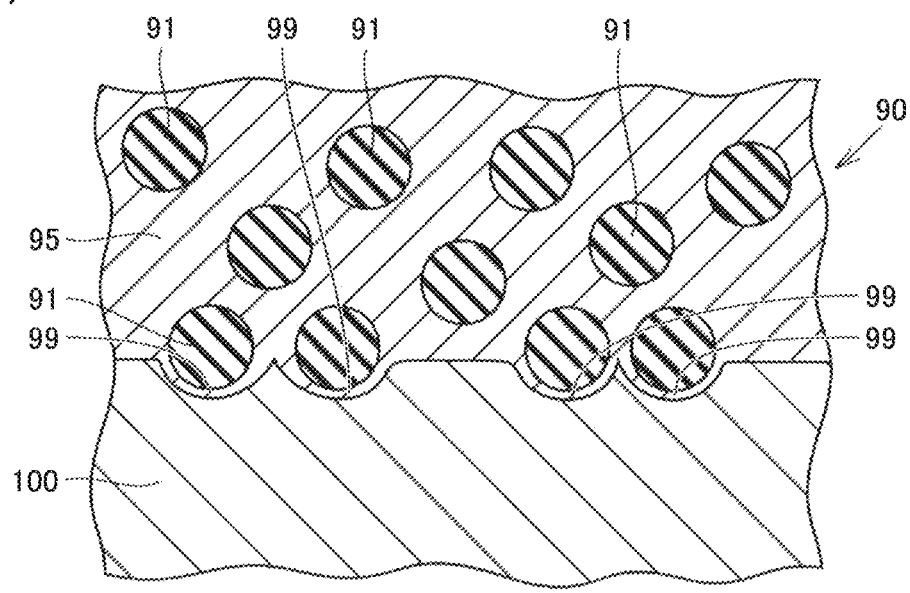
FIG. 7 is a schematic cross-sectional view showing the structure at and around an interface between the overlay and a base.

A description will now be made about the structure of an overlay formed on the sprocket wheel 5 and the bushings 13. FIG. 6 is a schematic cross-sectional view showing the structure of an overlay at and near its surface. FIG. 7 is a schematic cross-sectional view showing the structure at and around an interface between the overlay and a base. Referring to FIGS. 6 and 7, an overlay 90 (overlay 52 and overlay 132) formed on the sprocket wheel 5 and the bushings 13 includes a matrix 95 made of a second metal, and hard particles 91 dispersed in the matrix 95. The second metal forming the matrix 95 can be, for example, a mixture of a metal derived from a welding wire and the metal (first metal) forming a base 100 (base 50 and base 134). As the hard particles 91, particles having higher hardness than the matrix 95, for example particles of cemented carbide, can be adopted. The overlay 90 has higher earth and sand abrasion resistance than the base 100.

Referring to FIG. 6, the surface 90A of the overlay 90 is a forged surface. The hard particles 91 located in an overlay surface region 90B, which is a region within an average particle diameter of the hard particles 91 from the surface 90A of the overlay 90, are arranged side by side while being embedded in the overlay 90. This prevents the hard particles 91 from being arranged protruding noticeably from the surface 90A of the overlay 90. This consequently prevents the hard particles 91 from falling off during the use of the sprocket wheel 5 and the bushings 13, leading to improved wear resistance of the sprocket wheel 5 and the bushings 13.

The hard particles 91 located in the overlay surface region 90B may be arranged in contact with the surface 90A of the overlay 90, as shown in FIG. 6. With this, the region of a hard particle 91 exposed from the surface 90A of the overlay 90 becomes small, which prevents the hard particle 91 from falling off.

As shown in FIG. 6, among the hard particles 91 located in the overlay surface region 90B, any hard particle 91 having a region exposed from the surface 90A of the overlay 90 may have an acute central angle θ (of less than 90°) corresponding to that exposed region. With this, the region of a hard particle 91 exposed from the surface 90A of the overlay 90 becomes small, which prevents the hard particle 91 from falling off.

Referring to FIG. 7, in a region including an interface between the overlay 90 and the base 100, the overlay 90 includes protrusions 99 that protrude toward the base 100. The protrusions 99 provide an anchor effect to prevent the overlay 90 from coming off the base 100. A protrusion 99 receives at least a part of a hard particle 91. This more reliably prevents the overlay 90 from coming off the base 100. There exists the matrix 95 of the overlay 90 between the base 100 and the hard particle 91 received in the protrusion 99. The hard particle 91 received in the protrusion 99 is not in contact with the base 100. The hard particle 91 has its center located outside the protrusion 99 (i.e., a part of the hard particle 91 having a volume less than a half thereof is received in the protrusion 99). One hard particle 91 is received in one protrusion 99. Each protrusion 99 has a depth that is smaller than the radius of the hard particle 91 received in the protrusion 99.

Figure 8:
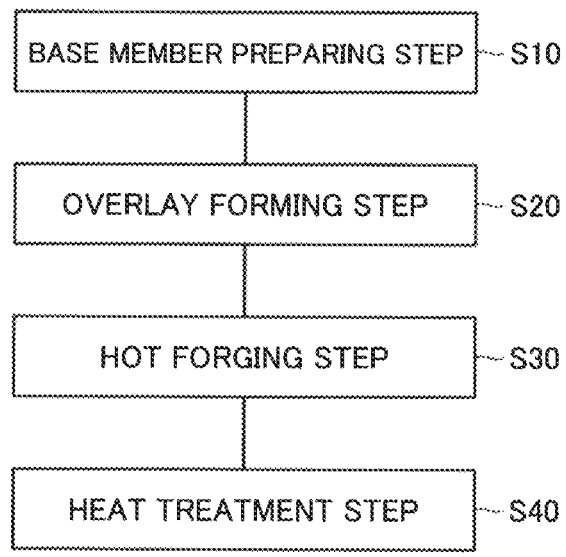
FIG. 8 is a flowchart schematically illustrating a method for producing a machine component (sprocket wheel and bushing)
Figure 9:
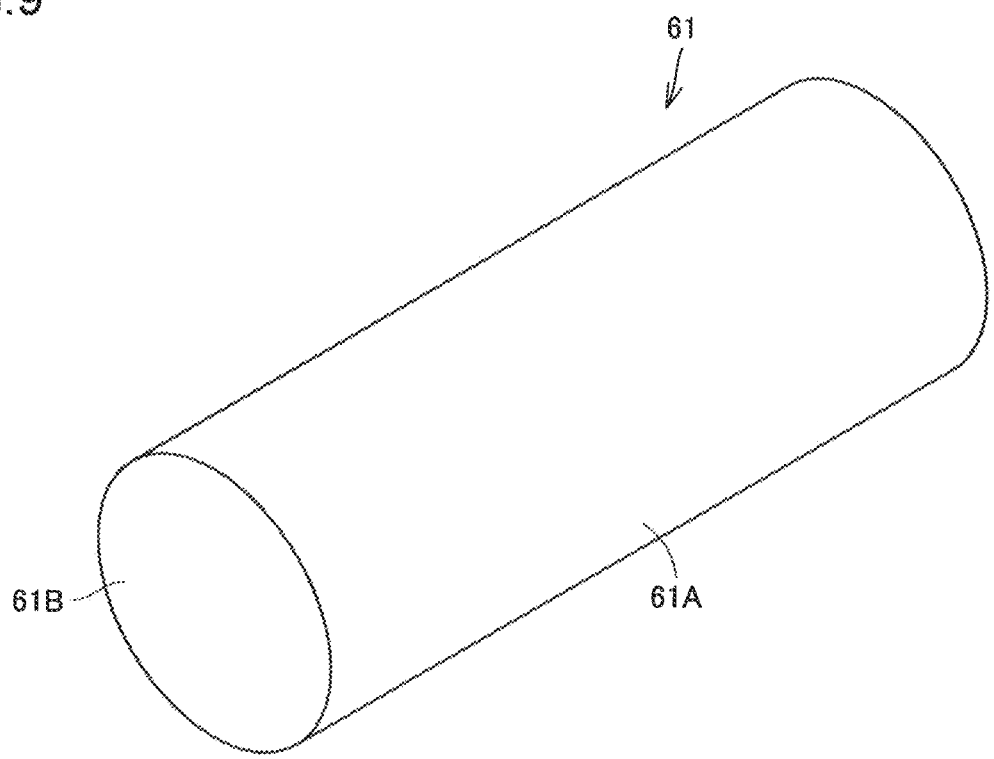
FIG. 9 is a schematic perspective view illustrating a method for producing a sprocket wheel.
Figure 10:
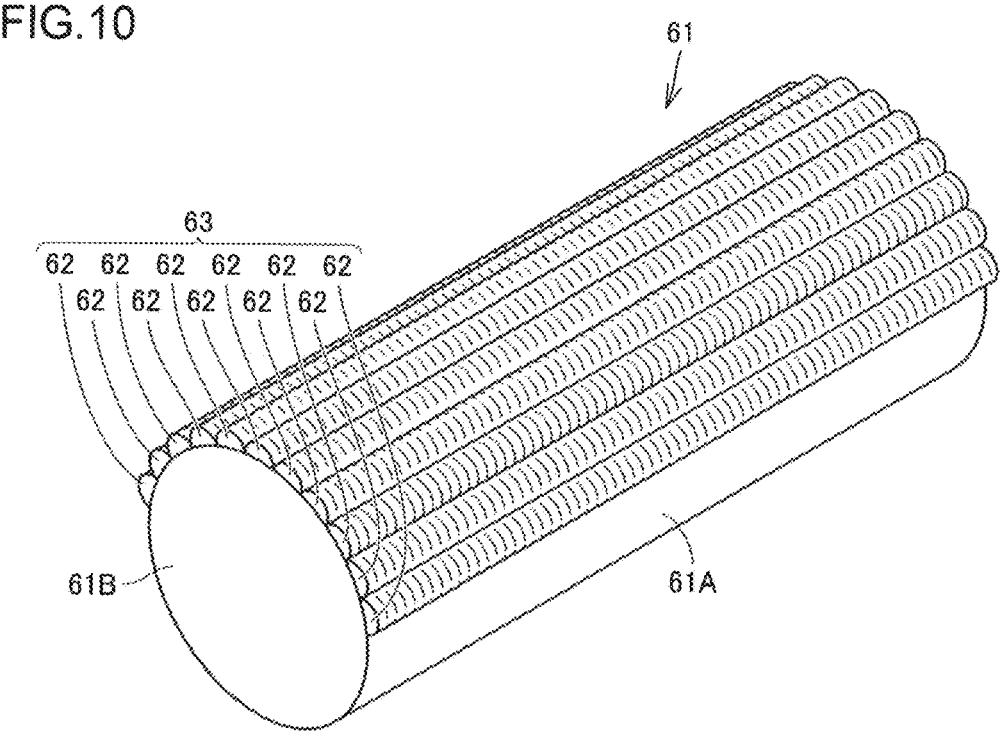
FIG. 10 is a schematic perspective view illustrating the method for producing the sprocket wheel.
Figure 11:
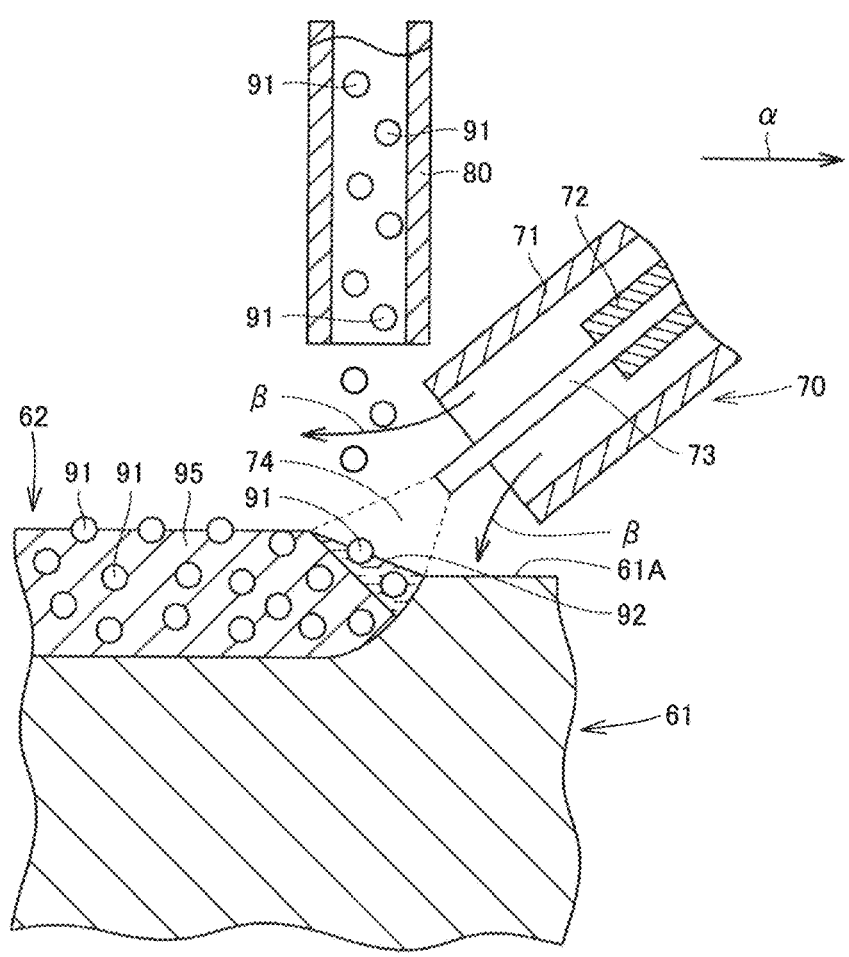
FIG. 11 is a schematic cross-sectional view illustrating a method for forming an overlay.

A method for producing a sprocket wheel 5, which is the machine component in the present embodiment, will now be described with reference to FIGS. 8 to 13. FIG. 8 is a flowchart schematically illustrating a method for producing a sprocket wheel which is the machine component. FIGS. 9, 10, 12, and 13 are schematic perspective views illustrating the method for producing the sprocket wheel. FIG. 11 is a schematic cross-sectional view illustrating a method for forming an overlay.

Referring to FIG. 8, in the method for producing a sprocket wheel 5 in the present embodiment, first, a base member preparing step is carried out as a step S10. In this step S10, referring to FIG. 9, a base member 61, which is to be a base 50 of the sprocket wheel 5, is prepared. The base member 61 is made of a metal forming the base 50. The base member 61 is of a cylindrical shape. The base member 61 includes a pair of end faces 61B and a side face 61A connecting the end faces 61B.

Next, an overlay forming step is carried out as a step S20. In this step S20, referring to FIGS. 9 and 10, an overlay 63 is formed to cover a part of the side face 61A of the base member 61 prepared in the step S10. The overlay 63 is formed over the entire area in the longitudinal direction of the base member 61. The overlay 63 is formed in a part in the circumferential direction (over approximately a half in the circumferential direction) of the base member 61. The overlay 63 has a structure in which beads 62, extending in the longitudinal direction of the base member 61, are laid side by side in the circumferential direction, with no gaps therebetween.

The overlay 63 may be formed by, for example, overlaying welding using $CO_2$ arc welding as described below. First, an overlay forming device will be described. Referring to FIG. 11, the overlay forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the tip end side of the welding nozzle 71. For the welding wire, JIS YGW12, for example, can be adopted. A gap between the welding nozzle 71 and the contact tip 72 is a flow path of shielding gas.

The shielding gas flowing through the flow path is discharged from the tip end of the welding nozzle 71. The hard particles supplying nozzle 80 has a hollow cylindrical shape. Inside the hard particles supplying nozzle 80, hard particles 91 are supplied, which are discharged from the tip end of the hard particles supplying nozzle 80.

This overlay forming device can be used to form an overlay 63 through the following procedure. With a base member 61 as one electrode and the welding wire 73 as another electrode, voltage is applied across the base member 61 and the welding wire 73. This generates an arc 74 between the welding wire 73 and the base member 61. The arc 74 is shielded from the ambient air by the shielding gas discharged from the tip end of the welding nozzle 71 along the arrows β. For the shielding gas, carbon dioxide, for example, can be adopted. The heat in the arc 74 melts a part of the base member 61 and also melts the tip end of the welding wire 73. The tip end of the welding wire 73 thus molten forms droplets, which transfer to the molten region of the base member 61. This forms a molten pool 92 which is a liquid region where the molten base member 61 and the molten welding wire 73 are mixed together. The hard particles 91 discharged from the hard particles supplying nozzle 80 are supplied to this molten pool 92.

As the welding torch 70 and the hard particles supplying nozzle 80 constituting the overlaying welding device move relatively in the direction shown by the arrow a with respect to the base member 61, the position where the molten pool 92 is formed move accordingly. The molten pool 92 previously formed solidifies, resulting in a bead 62.

The bead 62 includes a matrix 95 formed by solidification of the molten pool 92, and hard particles 91 dispersed in the matrix 95. A plurality of such beads 62 are formed next to one another in the width direction, with no gaps therebetween, to cover a desired region on the side face 61A of the base member 61, whereby formation of the overlay 63 is completed (see FIG. 10). It should be noted that overlaying welding may be carried out, for example, under the following conditions: welding current of 230 A, welding voltage of 17 V, hard particles feed rate of 110 g/min, and excess bead height of 4 mm. For the welding wire, JIS YGW11 may be adopted. For the hard particles, WC- or $W_2C$-based particles may be adopted.

Figure 12:
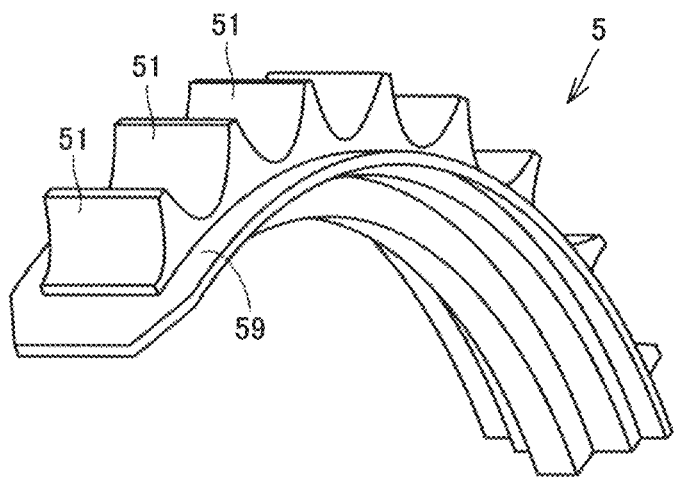
FIG. 12 is a schematic perspective view illustrating the method for producing the sprocket wheel.

Next, a hot forging step is carried out as a step S30. In this step S30, the base member 61 with the overlay 63 formed in the step S20 is hot forged. Referring to FIGS. 10 and 12, the base member 61 with the overlay 63 formed is heated to a temperature enabling hot forging, and then placed in a die having a cavity corresponding to a desired shape of the sprocket wheel 5, for forging. In the present embodiment, a plurality of arc-shaped parts, constituting an annular sprocket wheel 5, are produced by hot forging. The resultant parts are assembled in a later step, to obtain the annular sprocket wheel 5. With hot forging, the overlay 63 formed in the step S20 is worked. The base member 61 is hot forged such that the overlay 63 covers the outer peripheral surface of the sprocket wheel 5. In this manner, an overlay 52 having a smooth surface, from which surface profile affected by surface tension in the liquid state and the like has been eliminated, is obtained. As a result of hot forging, burr 59 is formed, as shown in FIG. 12. Thereafter, referring to FIGS.

Figure 13:
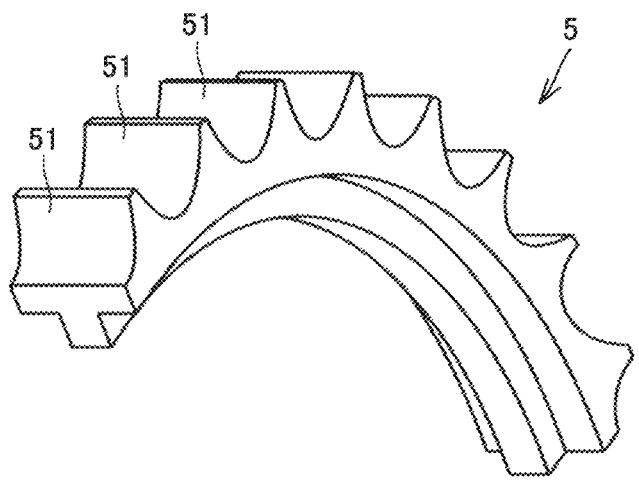
FIG. 13 is a schematic perspective view illustrating the method for producing the sprocket wheel.

12 and 13, die-cutting is carried out to remove the burr 59, whereby a part constituting the sprocket wheel 5 is obtained (see FIG. 13).

Referring to FIGS. 11 and 6, as the base member 61 having the overlay 63 formed is hot forged, hard particles 91 that were protruding from a surface of the overlay 63 (beads 62) during formation of the overlay 63 are pressed into the overlay 63 (beads 62). As a result, in the sprocket wheel 5, the hard particles 91 located in the overlay surface region 90B are arranged side by side while being embedded in the overlay 90. The hard particles 91 located in the overlay surface region 90B are arranged in contact with the surface 90A of the overlay 90. Among the hard particles 91 located in the overlay surface region 90B, any hard particle 91 having a region exposed from the surface 90A of the overlay 90 has an acute central angle θ (of less than 90°) corresponding to the exposed region. This prevents the hard particle 91 from falling off during the use of the sprocket wheel 5, leading to improved wear resistance of the sprocket wheel 5.

Referring to FIGS. 11 and 7, as the base member 61 having the overlay 63 formed is hot forged, protrusions 99 are formed in the overlay 90 in consequence of the hard particles 91 that were located in the vicinity of the interface between the overlay 63 (beads 62) and the base member 61 at the time of formation of the overlay 63 (beads 62). In a protrusion 99, at least a part of a corresponding hard particle 91 is received. The above process simultaneously forms the surface region of the overlay 90 which is excellent in wear resistance with the hard particles 91 arranged in contact with the surface 90A, and the protrusions 99 which prevent the overlay 90 from coming off the base 100.

Referring to FIG. 8, next, a heat treatment step is carried out as a step S40. In this step S40, the sprocket wheel 5 (the part constituting the sprocket wheel 5) obtained through hot forging in the step S30 is subjected to heat treatment. The heat treatment carried out in the step S40 is, for example, quenching and tempering. This imparts desired hardness and toughness to the base 50 of the sprocket wheel 5. Thereafter, in order to make it possible to mount the sprocket wheel 5 on a support body (not shown), a region where no overlay 90 has been formed is subjected to machining for the purposes of improving dimensional accuracy, forming a mounting hole, and so on. The sprocket wheel 5 (the part constituting the sprocket wheel 5) in the present embodiment is thus completed.

Figure 14:
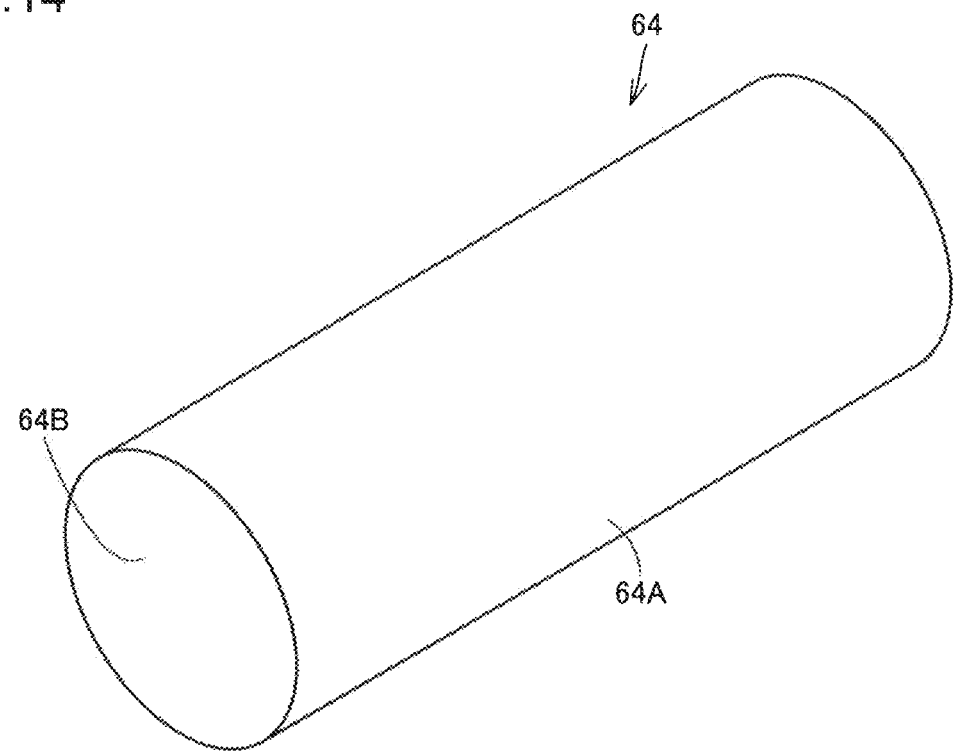
FIG. 14 is a schematic perspective view illustrating a method for producing a bushing.
Figure 15:
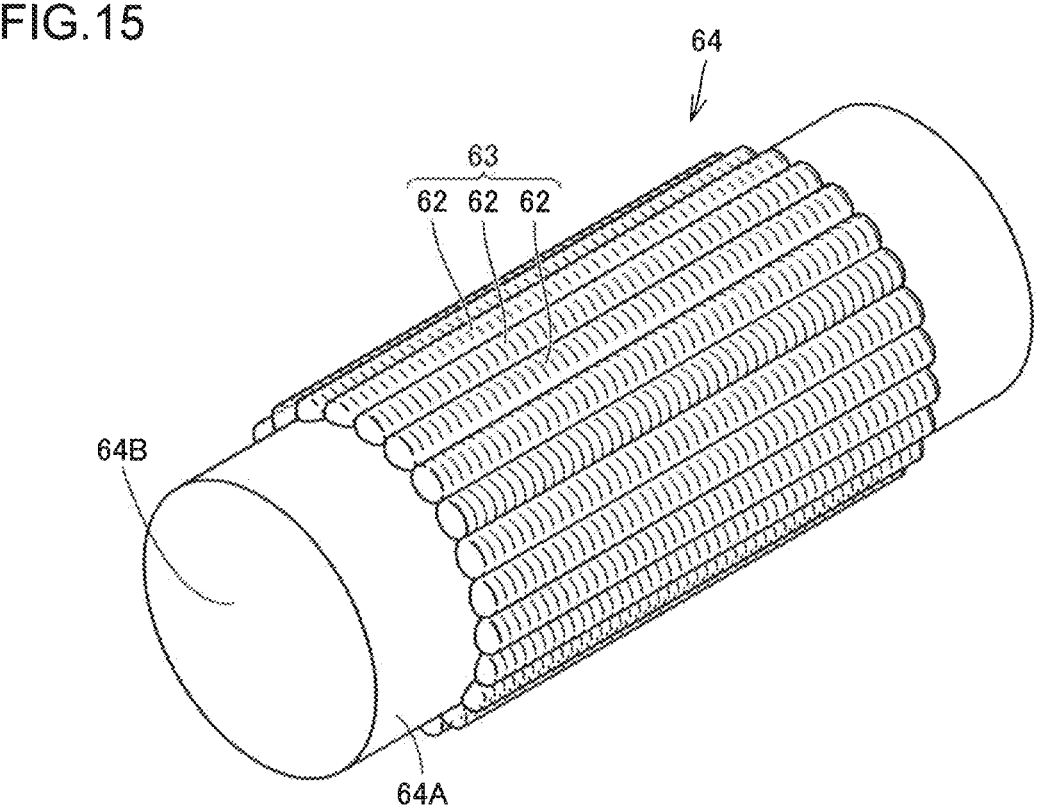
FIG. 15 is a schematic perspective view illustrating the method for producing the bushing.

A method for producing a bushing 13, which is the machine component in the present embodiment, will now be described with reference to FIGS. 8, 14, and 15. FIG. 8 is a flowchart schematically illustrating a method for producing a bushing. FIGS. 14 and 15 are schematic perspective views illustrating the method for producing the bushing. The bushing 13 in the present embodiment can be produced through a similar procedure as the sprocket wheel 5 described above.

Referring to FIG. 8, in the method for producing a bushing 13 in the present embodiment, first, a base member preparing step is carried out as a step S10. In this step S10, referring to FIG. 14, a base member 64, which is to be a base 134 of the bushing 13, is prepared. The base member 64 is made of a metal forming the base 134. The base member 64 is of a cylindrical shape. The base member 64 includes a pair of end faces 64B and an outer peripheral surface 64A connecting the end faces 61B.

Next, an overlay forming step is carried out as a step S20. In this step S20, referring to FIGS. 14 and 15, an overlay 63 is formed to cover a part of the outer peripheral surface 64A of the base member 61 prepared in the step S10. The overlay 63 is formed in the central portion in the longitudinal direction of the base member 64. No overlay 63 is formed in both end portions in the longitudinal direction of the base member 64. The overlay 63 is formed over the entire area in the circumferential direction of the base member 64. The overlay 63 has a structure in which beads 62, extending in the longitudinal direction of the base member 64, are laid side by side in the circumferential direction, with no gaps therebetween. The overlay 63 can be formed by, for example, overlaying welding using $CO_2$ arc welding, as in the case of producing the sprocket wheel 5 described above. It should be noted that the overlay 63 may be formed in a part in the circumferential direction of the base member 64, for example over a half of the circumference, corresponding to the region that is to come into contact with the sprocket wheel 5.

Next, a hot forging step is carried out as a step S30. In this step S30, the base member 64 with the overlay 63 formed in the step S20 is hot forged. Referring to FIG. 15 and FIGS. 3 to 5, the base member 64 with the overlay 63 formed is heated to a temperature enabling hot forging, and then placed in a die having a cavity corresponding to a desired shape of the bushing 13, for forging. With hot forging, the overlay 63 formed in the step S20 is worked. The base member 64 is hot forged such that the overlay 63 covers the outer peripheral surface 131 of the bushing 13. In this manner, an overlay 132 having a smooth surface, from which surface profile affected by surface tension in the liquid state and the like has been eliminated, is obtained. The both ends in the longitudinal direction of the base member 64, where no overlay 63 has been formed, become the smaller-diameter portions 139 of the bushing 13. Thereafter, a pin hole is formed to which a connecting pin 12 is to be inserted for connection of the links 7 and 8 (see FIG. 2). Referring to FIG. 3, the pin hole is defined by the inner peripheral surface 133 and extends in the axial direction.

As the base member 64 having the overlay 63 formed is hot forged, hard particles 91 that were protruding from a surface of the overlay 63 (beads 62) during formation of the overlay 63 are pressed into the overlay 63 (beads 62). As a result, in the bushing 13, the hard particles 91 located in the overlay surface region 90B are arranged side by side while being embedded in the overlay 90. The hard particles 91 located in the overlay surface region 90B are arranged in contact with the surface 90A of the overlay 90. Among the hard particles 91 located in the overlay surface region 90B, any hard particle 91 having a region exposed from the surface 90A of the overlay 90 has an acute central angle θ (of less than 90°) corresponding to the exposed region. This prevents the hard particle 91 from falling off during the use of the bushing 13, leading to improved wear resistance of the bushing 13.

As the base member 64 having the overlay 63 formed is hot forged, in the bushing 13, protrusions 99 are formed in the overlay 90 in consequence of the hard particles 91 that were located in the vicinity of the interface between the overlay 63 (beads 62) and the base member 64 at the time of formation of the overlay 63 (beads 62). In a protrusion 99, at least a part of a corresponding hard particle 91 is received.

Referring to FIG. 8, next, a heat treatment step is carried out as a step S40. In this step S40, the bushing 13 obtained through hot forging in the step S30 is subjected to heat treatment. The heat treatment carried out in the step S40 is, for example, quenching and tempering. This imparts desired hardness and toughness to the base 134 of the bushing 13. Thereafter, the smaller-diameter portions 139 of the bushing 13 are subjected to machining for the purposes of improving dimensional accuracy, reducing surface roughness, and so on. The bushing 13 in the present embodiment is thus completed.

It should be noted that in the method for producing the machine component in the above embodiment, when forming the overlay on the base member, a surface portion of the base member corresponding to the region of the base member where the overlay is to be formed may be removed in advance, or, an undercut portion may be formed in the base member, before formation of the overlay. This reduces the deformation amount of the overlay at the time of forging, thereby preventing, for example, wrinkling of the forged overlay.

EXAMPLES

A test piece was produced by forming an overlay on a base member by overlaying welding and by hot forging the base member to make the overlay worked, as in the producing method described in the above embodiment (Example). For comparison, another test piece was produced by forming an overlay after hot forging (Comparative example). The dies used for hot forging in the Example and in the Comparative example were of the same shape. Each test piece produced was cut, and the state of the overlay was observed with an optical microscope.

Figure 16:
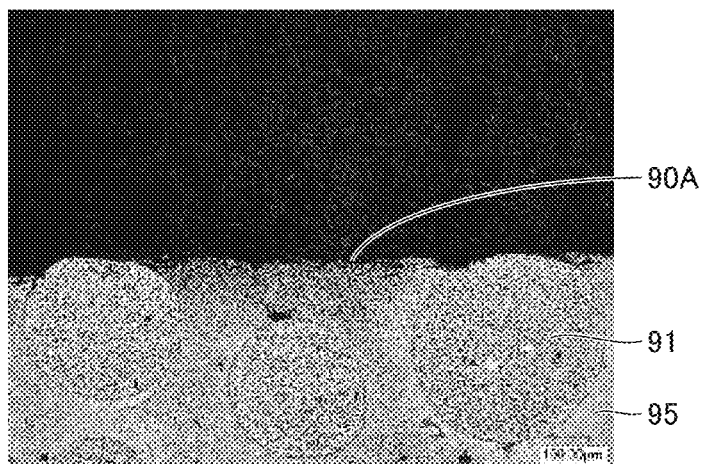
FIG. 16 is an optical micrograph showing a surface and its vicinity of an overlay (Example)
Figure 17:
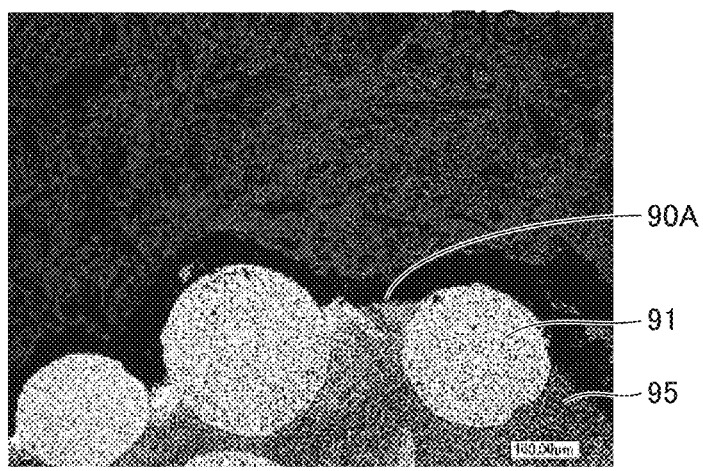
FIG. 17 is an optical micrograph showing a surface and its vicinity of an overlay (Comparative example)

FIG. 16 is an optical micrograph obtained by imaging a surface and its vicinity of the overlay of the Example. FIG. 17 is an optical micrograph obtained by imaging a surface and its vicinity of the overlay of the Comparative example. As shown in FIG. 17, in the overlay of the Comparative example, which has been formed by overlaying welding and not worked by forging thereafter, hard particles 91 protrude noticeably from the surface 90A of the overlay. Referring to FIG. 16, in the overlay of the Example, which has been formed and then worked by forging, hard particles 91 located in the surface region are arranged side by side in the state being embedded in the overlay (matrix 95). The hard particles 91 are aligned in contact with the surface 90A of the overlay. A hard particle 91 having a region exposed from the surface 90A of the overlay 90 has an acute central angle θ (of less than 90°) corresponding to the exposed region. This is presumably because, during the process in which the overlay is worked by forging, the hard particles 91 that were protruding from the surface 90A of the overlay are pressed into the matrix 95 having relatively low hardness.

Figure 18:
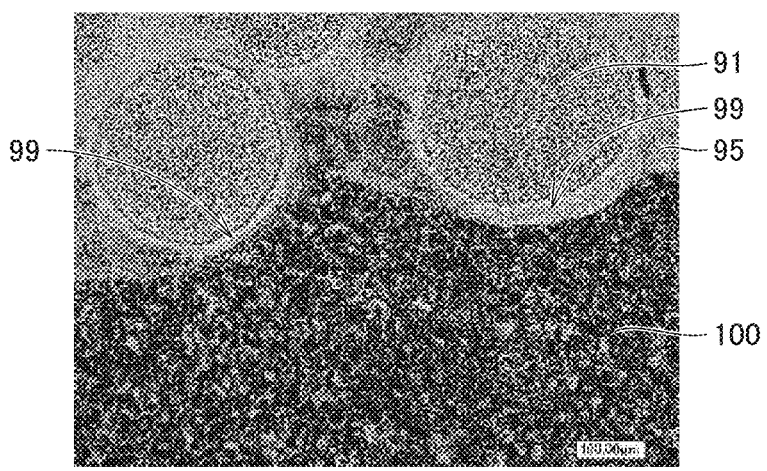
FIG. 18 is an optical micrograph showing an interface between an overlay and a base and its vicinity (Example)
Figure 19:
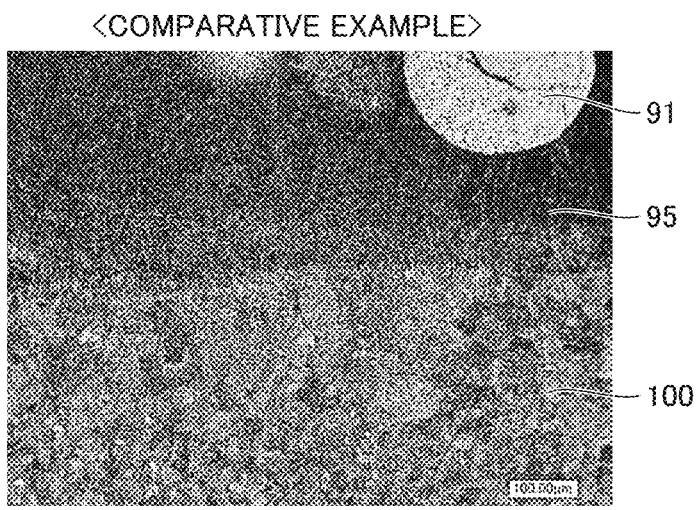
FIG. 19 is an optical micrograph showing an interface between an overlay and a base and its vicinity (Comparative example).

FIG. 18 is an optical micrograph obtained by imaging an interface between the overlay and the base and its vicinity of the Example. FIG. 19 is an optical micrograph obtained by imaging an interface between the overlay and the base and its vicinity of the Comparative example. As shown in FIG. 19, in the Comparative example where the overlay has been formed by overlaying welding and not worked by forging thereafter, the interface between the overlay (matrix 95) and the base 100 is flat. Referring to FIG. 18, in the Example which has been worked by forging after formation of the overlay, in the region including the interface between the overlay (matrix 95) and the base 100, protrusions 99 are formed with the overlay (matrix 95) protruding toward the base 100. In each protrusion 99, a part of a corresponding hard particle 91 is received. It is considered that the protrusions 99 have been formed while the overlay was worked by forging, in consequence of the hard particles 91 present in the vicinity of the interface with the base member. A hard particle 91 that has contributed to the formation of a protrusion 99 has at least a part received in the protrusion 99.

While the sprocket wheel and the bushings of a track travel device have been described as examples of the machine components of the present invention in the above embodiment, the machine components of the present invention are not limited thereto. The present invention is applicable to various kinds of machine components, including rollers (carrier rollers, track rollers) and idler tumbler constituting a tracked undercarriage of a work machine, for example, that are supposed to move relative to another component while being in contact with the other component.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The machine component and its producing method according to the present invention are applicable particularly advantageously to a machine component that is desired to be less damaging to another component, and to its producing method.

DESCRIPTION OF REFERENCE NUMERALS

1: track travel device; 2: track; 3: track frame; 4: idler tumbler; 5: sprocket wheel; 6: track shoe; 7: outer link; 8: inner link; 9: track link; 10: track roller; 11: carrier roller; 12: connecting pin; 13: bushing; 15: through hole; 50: base; 51: projection; 52: overlay; 53: outer peripheral surface; 59: burr; 61: base member; 61A: side face; 61B: end face; 62: bead; 63: overlay; 64: base member; 64A: outer peripheral surface; 64B: end face; 70: welding torch; 71: welding nozzle; 72: contact tip; 73: welding wire; 74: arc; 80: hard particles supplying nozzle; 90: overlay; 90A: surface; 90B: overlay surface region; 91: hard particle; 92: molten pool; 95: matrix; 99: protrusion; 100: base; 131: outer peripheral surface; 132: overlay; 133: inner peripheral surface; 134: base; and 139: smaller-diameter portion.

The invention claimed is:

1. A machine component having a contact region and moves relative to another component while being in contact with the other component in the contact region, the machine component comprising:
   a base made of a first metal; and
   an overlay covering the base so as to constitute at least a part of the contact region, the overlay having a smoothed surface, wherein the smoothed surface refers to a state at which a surface profile affected by surface tension in a liquid state has been eliminated from the surface of the overlay, the smoothed surface constituting the contact region, wherein after the overlay is formed via overlaying welding, the surface of the overlay constituting the contact region has been smoothed by forging; wherein
   the overlay includes:
      a matrix made of a second metal, and
      hard particles dispersed in the matrix; and
   the hard particles are WC- or $W_2C$-based particles; and wherein the surface of the overlay constituting the contact region was smoothed without changing the shape of the hard particles.

2. The machine component according to claim 1, wherein the hard particles located in an overlay surface region are arranged side by side while being embedded in the overlay, the overlay surface region being a region within an average particle diameter of the hard particles from the smoothed surface of the overlay constituting the contact region.

3. The machine component according to claim 2, wherein the hard particles located in the overlay surface region are arranged in contact with the surface of the overlay.

4. The machine component according to claim 2, wherein among the hard particles located in the overlay surface region, any hard particle having a region exposed from the surface of the overlay has an acute central angle corresponding to the region exposed from the surface of the overlay.

5. The machine component according to claim 1, wherein in a region including an interface between the overlay and the base, the overlay includes a protrusion that protrudes toward the base.

6. The machine component according to claim 5, wherein the protrusion has at least a part of the hard particle received therein.

7. A method for producing the machine component according to claim 1 having the contact region and moves relative to the other component while being in contact with the other component in the contact region, the method comprising the steps of:
preparing a base member made of the first metal;
forming the overlay in contact with a surface of the base member to cover the base member, the overlay being formed via overlay welding; and forging the base member having the overlay formed, such that the overlay constitutes at least part of the contact region such that the overlay is worked; wherein
the step of forming the overlay includes forming the overlay including the matrix made of the second metal and hard particles dispersed in the matrix; and
the hard particles are WC- or $W_2C$-based particles.

8. The machine component producing method according to claim 7, wherein the step of forging the base member having the overlay formed includes hot forging the base member having the overlay formed.

9. A machine component having a contact region and moves relative to another component while being in contact with the other component in the contact region, the machine component comprising:
a base made of a first metal; and
an overlay covering the base so as to constitute at least a part of the contact region, the overlay having a smoothed surface, wherein the smoothed surface refers to a state at which a surface profile affected by surface tension in a liquid state has been eliminated from the surface of the overlay, the smoothed surface constituting the contact region, wherein after the overlay is formed via overlaying welding, the surface of the overlay constituting the contact region has been smoothed by forging; wherein
the overlay includes:
a matrix made of a second metal, and
hard particles dispersed in the matrix;
the overlay having the smoothed surface having at least one hard particle having a region exposed from the surface of the overlay having the smoothed surface; and
the hard particles are WC- or $W_2C$-based particles; and
wherein the surface of the overlay constituting the contact region was smoothed without changing the shape of the hard particles.

10. The machine component according to claim 9, wherein each of the hard particles having the region exposed from the surface of the overlay having the smoothed surface have an acute central angle corresponding to the region exposed from the surface of the overlay.

11. A machine component having a contact region and moves relative to another component while being in contact with the other component in the contact region, the machine component comprising:
a base made of a first metal; and
an overlay covering the base so as to constitute at least a part of the contact region, the overlay, the overlay including:
a matrix of a second metal, and
hard particles dispersed in the matrix;
wherein
the overlay has a smoothed surface, wherein the smoothed surface refers to a state at which a surface profile affected by surface tension in a liquid state has been eliminated from the surface of the overlay, the smoothed surface constituting the contact region, wherein after the overlay is formed via overlaying welding such that at least one of the hard particles has a region exposed from the surface of the overlay, the surface of the overlay constituting the contact region has been smoothed by forging such that the at least one of the hard particles having the region exposed from the surface of the overlay is pressed deeper into the matrix of the overlay such that the region remaining exposed from the surface of the overlay has decreased;
and
the hard particles are WC- or $W_2C$-based particles; and
wherein the surface of the overlay constituting the contact region was smoothed without changing the shape of the hard particles.

12. The machine component according to claim 11, wherein each of the hard particles having the region exposed from the surface of the overlay having the smoothed surface have an acute central angle corresponding to the region exposed from the surface of the overlay.

* * * * *